US008487920B2

(12) United States Patent  
Park et al.

(10) Patent No.: US 8,487,920 B2
(45) Date of Patent: Jul. 16, 2013

(54) VOLTAGE GENERATORS IMPLEMENTING BOOSTING SCHEMES FOR GENERATING BOOSTING VOLTAGES AND RELATED METHODS

(75) Inventors: Jae-Ho Park, Gyeonggi-do (KR); Won-Sik Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1319 days.

(21) Appl. No.: 11/963,213

(22) Filed: Dec. 21, 2007

(65) Prior Publication Data

US 2008/0211466 A1  Sep. 4, 2008

(30) Foreign Application Priority Data

Dec. 27, 2006  (KR) .................. 10-2006-0135301

(51) Int. Cl.
*G09G 5/00* (2006.01)
(52) U.S. Cl.
USPC ........... 345/210; 327/335; 327/536; 327/173; 363/101; 379/401; 362/62; 362/63; 362/80; 323/234; 345/211
(58) Field of Classification Search
USPC ................. 345/38, 50, 87–97, 104, 210, 211; 365/189.07, 189.09, 189.11, 189.15, 191; 365/149, 233.1, 233.11, 226; 363/101; 362/62, 362/63, 80; 379/401; 327/335, 536, 157
See application file for complete search history.

(56) References Cited

U.S. PATENT DOCUMENTS

| 6,275,425 | B1 * | 8/2001 | Eliason ................... 365/189.11 |
| 2003/0067429 | A1 | 4/2003 | Aoki et al. | |
| 2004/0104875 | A1 * | 6/2004 | Kim et al. .................. 345/87 |
| 2004/0109526 | A1 * | 6/2004 | Park et al. .................. 377/64 |
| 2004/0125069 | A1 * | 7/2004 | Park et al. ................. 345/100 |
| 2005/0062520 | A1 * | 3/2005 | Kim et al. ................. 327/536 |
| 2005/0156854 | A1 * | 7/2005 | Park et al. ................. 345/100 |

FOREIGN PATENT DOCUMENTS

| JP | 2003-037487 | | 2/2003 |
| JP | 2003037487 | A | 2/2003 |
| JP | 2003107520 | A | 4/2003 |
| KR | 1020030028710 | A | 4/2003 |
| KR | 1020040054483 | A | 6/2004 |
| KR | 1020040068239 | A | 7/2004 |
| KR | 1020050029813 | A | 3/2005 |
| KR | 1020050103544 | A | 11/2005 |
| KR | 1020060020235 | A | 3/2006 |

OTHER PUBLICATIONS

Korean Notice of Allowance and English translation (6 Pages) corresponding to Korean Application No. KR10/2006/0135301, Mailing Date: Jun. 25, 2008.

* cited by examiner

*Primary Examiner* — Amare Mengistu
*Assistant Examiner* — Vinh Lam
(74) *Attorney, Agent, or Firm* — Myers Bigel Sibley & Sajovec

(57) ABSTRACT

A voltage generators is provided including a boosting circuit and a boosting control circuit. The boosting circuit is configured to boost a power voltage to generate first through fourth voltages. The boosting control circuit is configured to control the boosting circuit to enable the first through fourth voltages to be generated in sequence, such that when a current voltage of the first through fourth voltages is boosted to a predetermined level, a voltage next to the current voltage is generated. Related liquid crystal displays and methods are also provided.

9 Claims, 5 Drawing Sheets

VOLTAGE GENERATORS IMPLEMENTING BOOSTING SCHEMES FOR GENERATING BOOSTING VOLTAGES AND RELATED METHODS

CLAIM OF PRIORITY

This application claims priority under 35 U.S.C. §119 to Korean Patent Application No. 10-2006-135301, filed on Dec. 27, 2006 in the Korean Intellectual Property Office (KIPO), the content of which is hereby incorporated herein by reference as if set forth in its entirety.

FIELD OF THE INVENTION

The present invention generally relates to semiconductor devices and, more particularly, to boosting schemes for semiconductor devices that generate a plurality of voltages.

BACKGROUND OF THE INVENTION

Electronic devices having liquid crystal displays (LCDs), such as personal digital assistants (PDAs), have complex circuit configurations including a plurality of circuit blocks to perform various functions of the electronic device. A plurality of voltages having different levels may be required for the circuit blocks. Hence, a power voltage supplied from the outside may be boosted to generate the plurality of voltages having the different levels in the electronic devices.

The plurality of voltages are typically sequentially boosted for stable operations of the electronic devices when the electronic devices are powered on. Points in time (durations) when a plurality of voltages are generated, i.e., time intervals between points in time when a plurality of voltages are generated, can be obtained by adding the optimum time interval obtained by simulation and a margin obtained by considering stability. As a result, in a case where the number of voltages to be boosted increases, the time taken from the power-on to generating of the last boosting voltage increases. In addition, the optimum time interval may be changed according to process characteristics of the electronic devices and their surrounding environments. The cost and time for obtaining the optimum points for generating boosting voltages through simulations and tests increase.

SUMMARY OF THE INVENTION

Some embodiments of the present invention provide voltage generators including a boosting circuit and a boosting control circuit. The boosting circuit is configured to boost a power voltage to generate first through fourth voltages. The boosting control circuit is configured to control the boosting circuit to enable the first through fourth voltages to be generated in sequence, such that when a current voltage of the first through fourth voltages is boosted to a predetermined level, a voltage next to the current voltage is generated.

In further embodiments of the present invention, the boosting circuit may include an internal voltage generating unit configured to receive the power voltage to generate an internal voltage, a first boosting unit configured to receive the internal voltage to generate the first voltage, a second boosting unit configured to receive the first voltage to generate the second and third voltages, and a third boosting unit configured to receive the third voltage to generate the fourth voltage.

In still further embodiments of the present invention, the boosting control circuit may include a first enable circuit configured to generate a first enable signal such that the second boosting unit generates the second voltage when the first voltage is boosted to a predetermined level, a second enable circuit configured to generate a second enable signal such that the second boosting unit generates the third voltage when the second voltage is boosted to a predetermined level, and a third enable circuit configured to generate a third enable signal such that the third boosting unit generates the fourth voltage when the third voltage is boosted to a predetermined level.

In some embodiments of the present invention, the first enable circuit may include a first resistor connected between the first voltage and a first node, a second resistor connected between the first node and a ground voltage, and a first comparator configured to compare a voltage of the first node with a first reference voltage to generate the first enable signal.

In further embodiments of the present invention, the second enable circuit may include a third resistor connected between the second voltage and a second node, a fourth resistor connected between the second node and a ground voltage, and a second comparator configured to compare a voltage of the second node with a second reference voltage to generate the second enable signal.

In still further embodiments of the present invention, the third enable circuit may include a fifth resistor connected between the third voltage and a third node, a sixth resistor connected between the third node and a ground voltage, and a third comparator configured to compare a voltage of the third node with a third reference voltage to generate the third enable signal.

Some embodiments of the present invention provide liquid crystal display devices including a liquid crystal panel displaying an image, and a voltage generator receiving a power voltage to generate first through fourth voltages for driving the liquid crystal panel. The voltage generator includes a first boosting circuit configured to boost the power voltage to generate the first voltage, a second boosting circuit configured to receive the power voltage, the first voltage, and the fourth voltage to generate the second and third voltages, a third boosting circuit configured to receive the power voltage to generate the fourth voltage, and a boosting control circuit configured to control the boosting circuit such that the first through fourth voltages are sequentially generated to enable generation of the next voltage of one of the first through fourth voltages when one of the first through fourth voltages is boosted to a predetermined level.

In further embodiments of the present invention, the boosting control circuit may include a first enable circuit configured to generate a first enable signal such that the second boosting circuit generates the second voltage when the first voltage is boosted to a predetermined level, a second enable circuit configured to generate a second enable signal such that the second boosting circuit generates the third voltage when the second voltage is boosted to a predetermined level, and a third enable circuit configured to generate a third enable signal such that the third boosting circuit generates the fourth voltage when the third voltage is boosted to a predetermined level.

Still further embodiments of the present invention provide methods of generating a voltage. A power voltage is boosted to generate first through fourth voltages and a boosting circuit is controlled to enable the first through fourth voltages to be generated in sequence, such that when a current voltage of the first through fourth voltages is boosted to a predetermined level, a voltage next to the current voltage is generated.

DETAILED DESCRIPTION OF EMBODIMENTS

Figure 1:
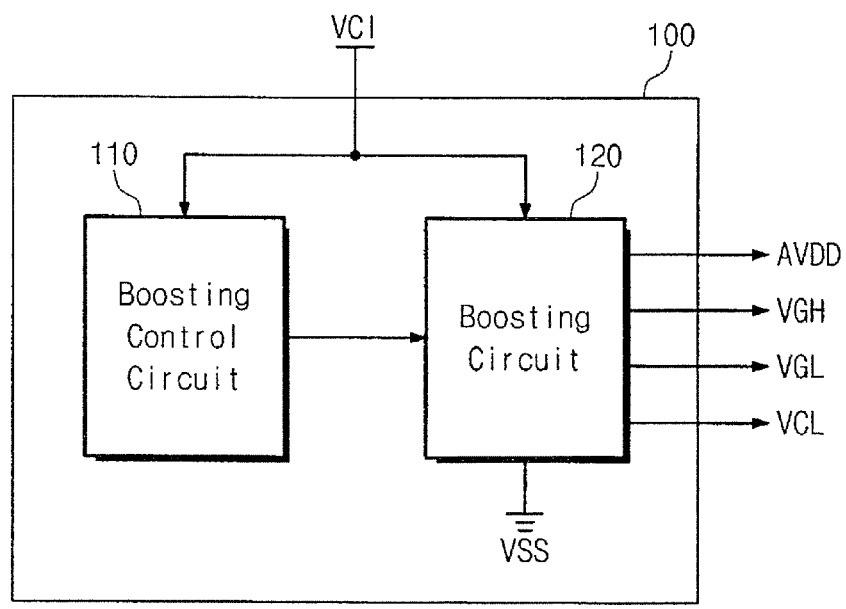
FIG. 1 is a block diagram of a voltage generator in accordance with some embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Referring first to FIG. 1, a block diagram of a voltage generator 100 according to some embodiments of the present invention will be discussed. As illustrated in FIG. 1, the voltage generator 100 includes a boosting control circuit 110 and a boosting circuit 120. The boosting control circuit 110 receives a power voltage VCI from circuits external to the voltage generator 100 to generate control signals for controlling the boosting circuit 120. The boosting circuit 120 receives the power voltage VCI from circuits external to the voltage generator 100 to generate first through fourth boosting voltages AVDD, VGH, VGL and VCL in response to the control signals generated from the boosting control circuit 110.

The first through fourth boosting voltages AVDD, VGH, VGL and VCL are used in electronic devices including the voltage generator 100, for example, a computer system, a device having a liquid crystal display (LCD), a personal multimedia player (PMP), a mobile phone, an MP3 player, an audio system, and the like. Although in some embodiments of the present invention, the boosting circuit 120 generates the first through fourth boosting voltages AVDD, VGH, VGL and VCL, a number and level of each voltage generated by the boosting circuit 120 may be modified based on specifications associated with the electronic devices.

Figure 2:
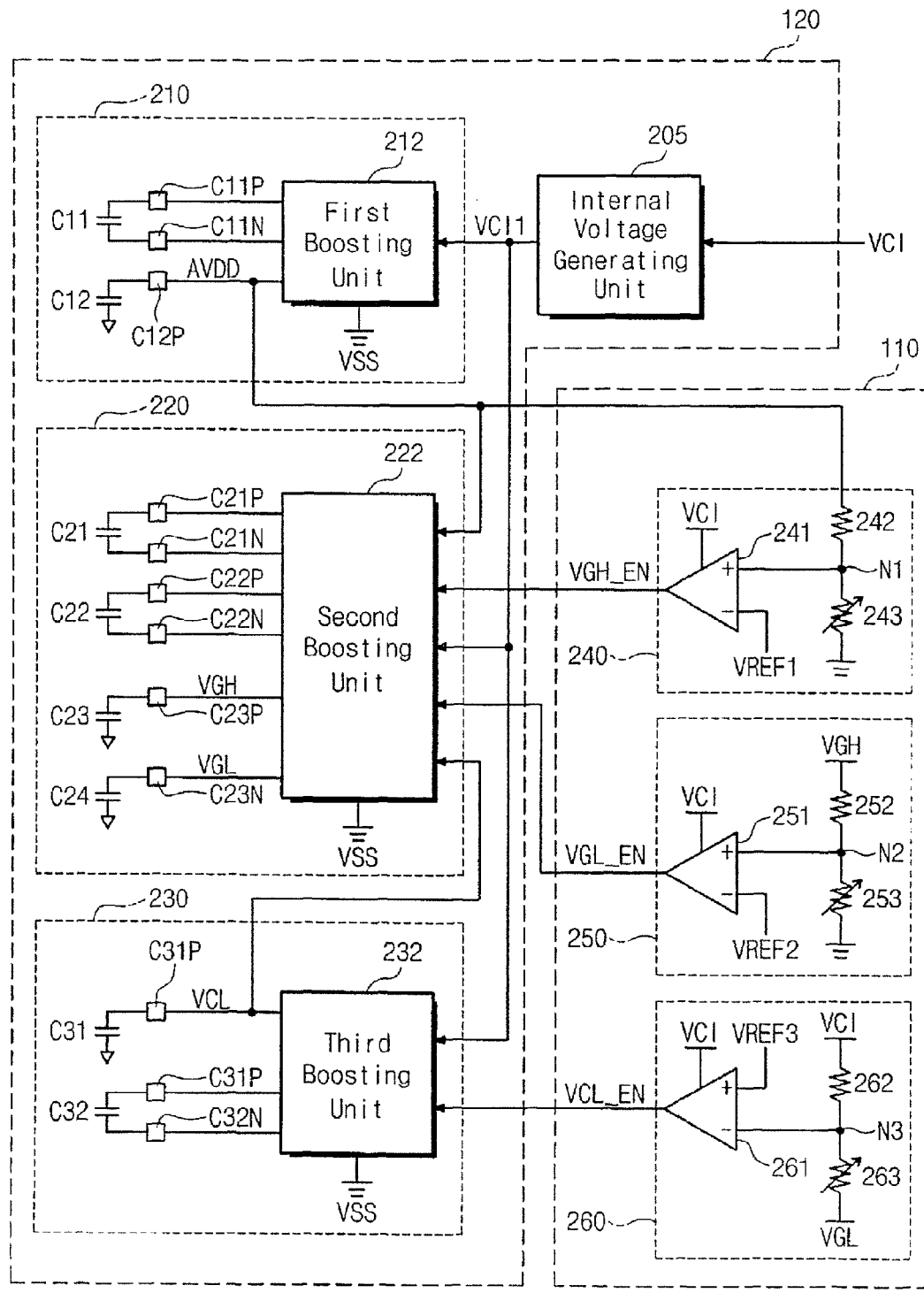
FIG. 2 is a schematic block diagram of a boosting control circuit and a boosting circuit of the voltage generator illustrated in FIG. 1 in accordance with some embodiments of the present invention.

Referring now to FIG. 2, a circuit diagram of the boosting control circuit 110 and the boosting circuit 120 of the voltage generator illustrated in FIG. 1 will be discussed. As illustrated in FIG. 2, the boosting control circuit 110 includes first through third enable units 240 through 260. The boosting circuit 120 includes an internal voltage generating unit 205 and first through third boosting circuits 210 through 230.

The boosting control circuit 110 receives the power voltage VCI to generate an internal voltage VCI1 to generate enable signals VGH_EN, VGL_EN and VCL_EN for enabling the second and third boosting circuits 220 and 230 to generate a voltage. The internal voltage generating unit 205 receives the power voltage VCI to generate the internal voltage VCI1.

The first boosting circuit 210 includes a first boosting unit 212 and capacitors C11 and C12. The capacitor C11 is connected to a first boosting unit 212 through terminals C11P and C11N and the capacitor C12 is connected to the first boosting unit 212 through a terminal C12P. The first boosting circuit 210 receives the internal voltage VCI1 to generate a first voltage AVDD to the terminal C12P.

The second boosting circuit 220 includes a second boosting unit 222 and capacitors C21 through C24. The capacitors C21 and C22 are connected to the second boosting unit 222 through terminals C21P and C21N and terminals C22P and C22N, respectively. One ends of the capacitors C23 and C24 are connected to the second boosting unit 222 through terminals C23P and C24P, respectively. The other ends of the capacitors C23 and C24 are connected to ground voltages, respectively. The second boosting circuit 220 receives a first voltage AVDD from the internal voltage VCI1 and the first boosting circuit 210. The second boosting circuit 220 receives a fourth voltage VCL from the third boosting circuit 230. The second boosting circuit 220 generates a second voltage VGH to the terminal C23P in response to the first enable signal VGH_EN generated from the first enable circuit 240, and generates a third voltage VGL to the terminal C23N in response to the second enable signal VGL_EN generated from the second enable circuit 250.

The third boosting circuit 230 includes a third boosting unit 232 and capacitors C31 and C32. One end of the capacitor C31 is connected to the third boosting unit 232 through a terminal C31P. The capacitor C32 is connected to the third boosting unit 232 through terminals C32P and C32N. The third boosting circuit 230 receives the internal voltage VCI1 to generate a fourth voltage VCL to a terminal C31P in response to the third enable signal VCL_EN generated from the third enable circuit 240.

The boosting circuit 220 receives the internal voltage VCI1, the first voltage AVDD generated from the first boosting circuit 210, and the fourth voltage VCL generated from the third boosting circuit 230 to generate the second and third voltages VGH and VGL. In case that the fourth voltage VCL is supplied to the second boosting unit 222 before it is sufficiently stabilized to a normal voltage level, a latch-up may occur in the second boosting unit 222. The second boosting unit 222 can generate the second voltage VGH when the first voltage AVDD generated from the first boosting unit 212 is sufficiently high.

In order to control the points when voltages of the first through third boosting units 212 through 232 are generated, a voltage generation command is input from the outside into the first and third boosting unit 212 through 232, or the time intervals of the second through fourth voltages VGH, VGL and VCL are adjusted by providing a counter into the second and third boosting units 222 and 232. The first through third enable circuits 240 through 260 within the boosting control circuit 110 generate the first through third enable signals VGH_EN, VGL_EN and VCL_EN to control generations of the second through fourth voltages VGH, VGL and VCL, respectively.

The first enable circuit 240 includes a comparator 241 and resistors 242 and 243. The resistor 242 is connected between the first voltage AVDD generated form the first boosting unit 212 and a first node N1. The resistor 243 is a variable resistor and connected between the first node N1 and a ground voltage. The comparator 241 compares a voltage of the first node N1 with a first reference voltage VREF1. Therefore, the comparator 241 activates the first enable signal VGH_EN when the voltage of the first node N1 is greater than the first reference voltage VREF1.

The second enable circuit 250 includes a comparator 251 and resistors 252 and 253. The resistor 252 is connected between the second voltage VGH generated from the second boosting unit 222 and a second node N2. The resistor 253 is a variable resistor and connected between the second node N2 and a ground voltage. The comparator 251 compares a voltage of the second node N2 with a second reference voltage VREF2. Therefore, the comparator 251 activates the second enable signal VGL_EN when the voltage of the second node N2 is greater than the second reference voltage VREF2.

The third enable circuit 260 includes a comparator 261 and resistors 262 and 263. The resistor 262 is connected between the power voltage VCI generated form the outside and a third node N3. The resistor 263 is a variable resistor and connected between the third node N3 and the third voltage VGL generated from the second boosting unit 222. The comparator 261 compares a voltage of the third node N3 with a third reference voltage VREF3. Therefore, the comparator 261 activates the third enable signal VCL_EN when the voltage of the third node N3 is greater than the third reference voltage VREF3.

In some embodiments of the present invention, the boosting control circuit 110 may include a reference voltage generating unit (not shown) for generating the reference voltages VREF1 through VREF3. In some embodiments, the reference voltages VREF1 through VREF3 may be directly provided from the outside to the enable signals 240 through 260.

Figure 3:
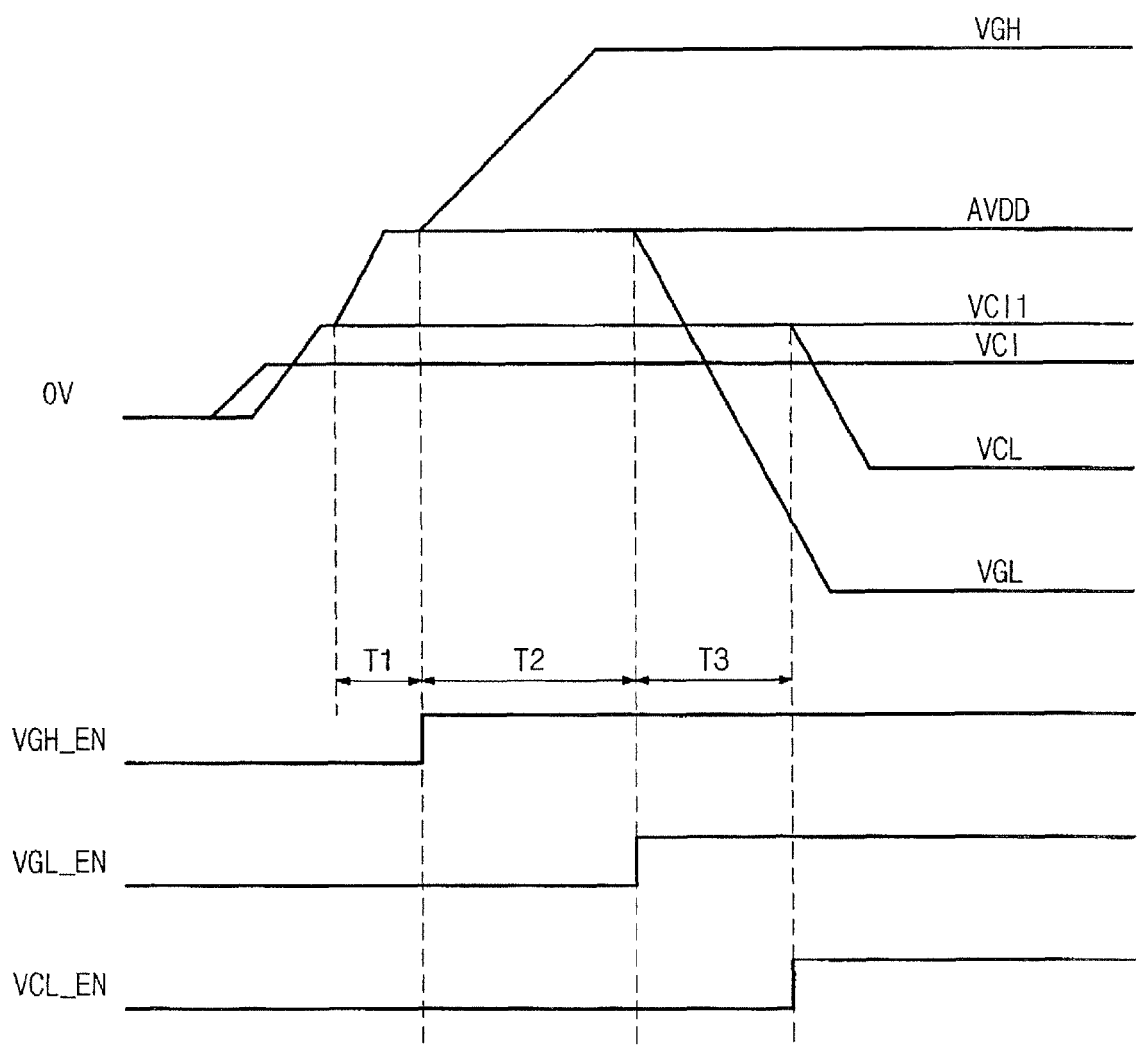
FIG. 3 is a timing diagram illustrating changes of first through third enable signals generated from a boosting control circuit and first through fourth voltages generated from a boosting circuit at power-on in accordance with some embodiments of the present invention.

Operations of the boosting control circuit 110 and the boosting circuit 120 having the same configurations discussed above will be discussed with respect to FIGS. 2 and 3. FIG. 3 is a view of changes of first through third enable signals generated from the boosting control circuit and first through fourth voltages generated from the boosting circuit at power-on.

An internal voltage generating unit 205 generates an internal voltage VCI1 when a power voltage VCI is supplied from the outside. A first boosting unit 212 generates a first voltage AVDD due to the increase of the internal voltage VCI1.

A first enable circuit 240 activates a first enable signal VGH_EN when the first voltage AVDD is boosted to a predetermined level. A second boosting unit 222 generates a second voltage VGH when the first enable signal VGF_EN is activated.

A second enable circuit 250 activates a second enable signal VGL_EN when the second voltage VGH is boosted to a predetermined level. A second boosting unit 222 generates a third voltage VGL when the second enable signal VGL_EN is activated.

A third enable circuit 260 activates a third enable signal VCL_EN when the third voltage VGL is boosted to a level lower than a predetermined level. A third boosting unit 232 generates a fourth voltage VCL when the third enable signal VCL_EN is activated. Referring to FIG. 3, the third and fourth voltages VGL and VCL are less than zero.

As discussed above, the boosting circuit 120 sequentially generates the first voltage AVDD, the second voltage VGH, the third voltage VGL, and the fourth voltage VCL in response to the first through third enable signals VGH_EN, VGL_EN and VCL_EN when the power voltage VCI is supplied from the outside.

The second and third boosting units 222 and 232 according to some embodiments of the present invention sequentially generate the second through fourth voltages VGH, VGL and VCL in response to the first through third enable signals VGH_EN, VGL_EN and VCL_EN generated from the boosting control circuit 110 without receiving a voltage generation command from the outside or providing a counter. The next voltage is automatically generated when the previous voltage is sufficiently boosted to a target level. Hence, a complex simulation necessary for sequentially generating a plurality of voltages may be unnecessary. The time taken from the power-on to generating of the last boosting voltage can be reduced, because of not determining the optimum points when voltages are generated by adding the optimum time interval obtained by simulation and a margin obtained by considering stability, but automatically generating the next voltage when the previous voltage is boosted to a predetermined level. Furthermore, although the time taken for boosting each voltage may change according to process characteristics and surroundings of electronic devices, a plurality of voltages may be stably generated.

Figure 4:
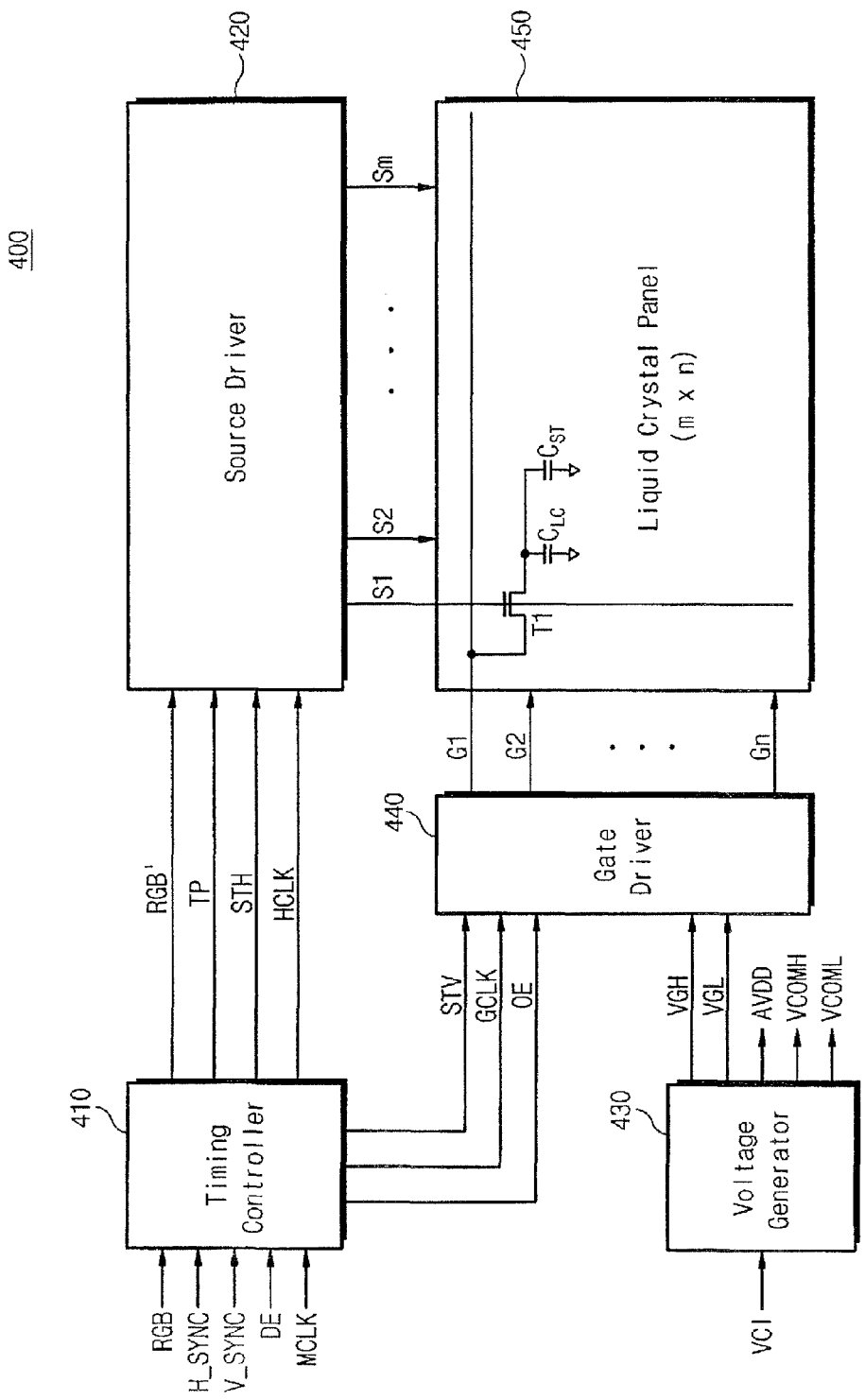
FIG. 4 is a block diagram of a liquid crystal display (LCD) device including a voltage generator in accordance with some embodiments of the present invention.

Referring now to FIG. 4, a block diagram of an LCD device 400 including a voltage generator according to some embodiments of the present invention will be discussed. As illustrated in FIG. 4, the LCD device 400 includes a timing controller 410, a source driver 420, a voltage generator 430, a gate driver 440, and a liquid crystal panel 450.

The liquid crystal panel 450 includes a plurality of gate lines G1-Gn, a plurality of source lines S1-Sm crossing over the plurality of gate lines G1-Gn, and a plurality of pixels arranged in individual regions that are defined by the gate lines G1-Gn and data lines. Each of the pixels includes a thin film transistor (TFT) T1 in which a gate electrode and a source electrode are respectively connected to the gate line and the data line, a liquid crystal capacitor $C_{LC}$ connected to a drain electrode of the TFT T1, and a storage capacitor $C_{ST}$. In such a pixel stricture, when the gate lines are sequentially selected by the gate driver 440 and a pulse type gate-on voltage is applied to the selected gate line, the TFT T1 of the pixel connected to the selected gate line is turned on, and a voltage containing pixel information is then applied to each of the data lines by the source driver 420. This voltage is applied to the liquid crystal capacitor $C_{LC}$ and the storage capacitor $C_{ST}$ through the TFT T1 in the corresponding pixel to drive the liquid and storage capacitors $C_{LC}$ and $C_{ST}$. Thus, a predetermined display operation can be performed.

The timing controller 410 receives a current pixel data signal RGB, a horizontal synchronization signal H_SYNC, a vertical synchronization signal V_SYNC, a clock signal MCLK, and a data enable signal DE, which are input from external devices. The timing controller 410 outputs a pixel data signal RGB' and control signals to the source driver 420, wherein a data format of the pixel data signal RGB' is converted to comply with the interface specification of the source driver 420. The control signals supplied to the source driver 420 from the timing controller 410 includes a latch signal TP, a start horizontal signal STH, and a horizontal clock signal HCLK.

The voltage generator 430 receives a power voltage VCI from the outside to generate various voltages for the operation of the LCD device 400, for example, a gate-on voltage VGH, a gate-off voltage VGL, an analog power voltage AVDD, a gate-on common voltage VCOMH, and a gate-off common voltage VCOML. The gate-on voltage VGH and the gate-off voltage VGL are supplied to the gate driver 440, and the analog power voltage AVDD is used as an operational voltage of the LCD device 400.

The gate driver 440 sequentially scans the gate lines G1-Gn of the liquid crystal panel 450 in response to the control signals, i.e., a start vertical signal STV, a gate clock signal GCLK, and an output enable signal OE, which are supplied from the timing controller 410. Herein, the scanning sequentially applies the gate-on voltage VGH to the gate lines, thereby changing the pixel in a gate line, to which the gate-on voltage VGH is applied, into a data recordable state.

The source driver 420 responds to the control signals, i.e., the latch signal TP, the start horizontal signal STH and the horizontal clock signal HCLK, which are supplied from the timing controller 110. Therefore, the source driver 40 drives the data lines D1-Dm of the liquid crystal panel 450 with gradation voltages corresponding to the pixel data signals RGB' among a plurality of gradation voltages generated from a gradation voltage generator (not shown).

Figure 5:
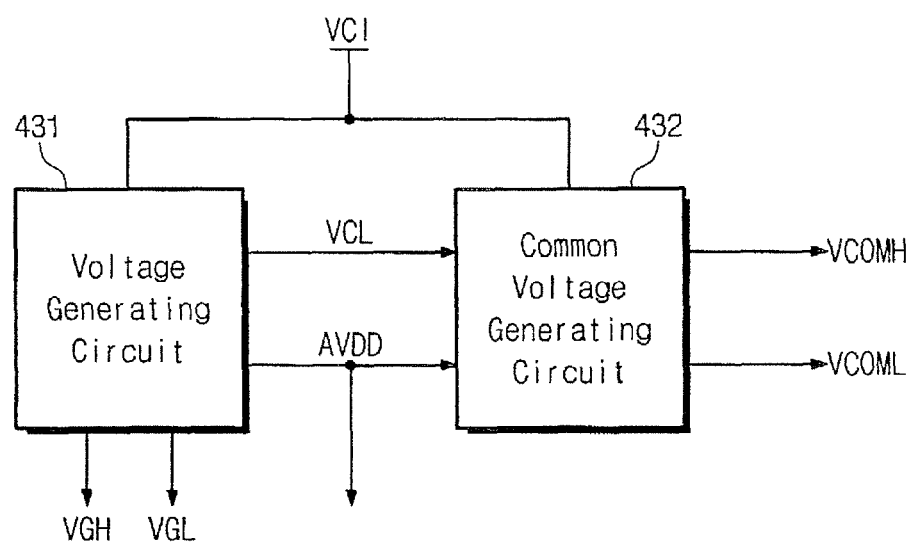
FIG. 5 is a block diagram of the voltage generator illustrated in FIG. 4 in accordance with some embodiments of the present invention.

Referring now to FIG. 5, a block diagram of the voltage generator illustrated in FIG. 4 according to some embodiments of the present invention will be discussed. As illustrated in FIG. 5, the voltage generator 430 includes a voltage generating circuit 431 and a common voltage generating circuit 432.

The voltage generating circuit 431 receives the power voltage from the outside to generate the common voltage VCL, the gate-on voltage VGH, the gate-off voltage VGL, and the analog power voltage AVDD. Here, the common voltage VCL is supplied to the common voltage generating circuit 432, and the gate-on voltage VGH and gate-off voltage VGL are used in the gate driver 440. The common voltage generating circuit 432 receives the power voltage VCI, the common voltage VCL and the analog power voltage AVDD, which are generated by the voltage generating circuit 431, and generates the gate-on common voltage VCOMH and the gate-off common voltage VCOML to be supplied to the common electrode of the capacitors $C_{LC}$ and $C_{ST}$ in the liquid crystal panel 450. Detailed constitution and operation of the voltage generating circuit 431 are similar to those illustrated in FIGS. 1 through 3.

The LCD device 400 according to some embodiments of the present invention includes the voltage generator 430 for generating various voltages for operations, and the voltage generator 430 can stably boost the plurality of voltages at the optimum speed.

According to some embodiments of the present invention, the voltage generator sequentially boosts the plurality of voltages at power-on. Since the next voltage is automatically generated when the previous voltage is sufficiently boosted to the target level, the complex simulation necessary for sequentially generating the plurality of voltages is unnecessary. The time taken from the power on to generating of the last boosting voltages can be reduced, because of not determining the optimum points when voltages are generated by adding the optimum time interval obtained by simulation and a margin obtained by considering stability, but automatically generating the next voltage when the previous voltage is boosted to a predetermined level. Furthermore, although the time taken for boosting each voltage may change according to process characteristics and surroundings of electronic devices, a plurality of voltages may be stably generated.

Although exemplary embodiments of the present invention have been described above with respect to FIGS. 1 through 5, it will be understood that the present invention should not be limited to these exemplary embodiments but various changes and modifications can be made by one skilled in the art within the spirit and scope of the present invention as hereinafter claimed.

That which is claimed is:

1. A voltage generator comprising:
   a boosting circuit configured to boost a power voltage to generate first through fourth voltages, the boosting circuit including a plurality of boosting units configured to generate at least one corresponding voltage; and
   a boosting control circuit configured to control the boosting circuit to enable the first through fourth voltages to be generated in sequence by automatically generating a next voltage in the sequence when a current voltage of one of the first through fourth voltages is boosted to a predetermined level, wherein the current voltage and the next voltage are generated by different boost units of the plurality of boosting units.

2. The voltage generator of claim 1, wherein the boosting circuit comprises:
   an internal voltage generating unit configured to receive the power voltage to generate an internal voltage;

a first boosting unit configured to receive the internal voltage to generate the first voltage;

a second boosting unit configured to receive the first voltage to generate the second and third voltages; and a third boosting unit configured to receive the third voltage to generate the fourth voltage.

3. The voltage generator of claim 2, wherein the boosting control circuit comprises:

a first enable circuit configured to generate a first enable signal such that the second boosting unit generates the second voltage when the first voltage is boosted to a predetermined level;

a second enable circuit configured to generate a second enable signal such that the second boosting unit generates the third voltage when the second voltage is boosted to a predetermined level; and a third enable circuit configured to generate a third enable signal such that the third boosting unit generates the fourth voltage when the third voltage is boosted to a predetermined level.

4. The voltage generator of claim 3, wherein the first enable circuit comprises:

a first resistor connected between the first voltage and a first node;

a second resistor connected between the first node and a ground voltage; and a first comparator configured to compare a voltage of the first node with a first reference voltage to generate the first enable signal.

5. The voltage generator of claim 3, wherein the second enable circuit comprises:

a third resistor connected between the second voltage and a second node;

a fourth resistor connected between the second node and a ground voltage; and a second comparator configured to compare a voltage of the second node with a second reference voltage to generate the second enable signal.

6. The voltage generator of claim 3, wherein the third enable circuit comprises:

a fifth resistor connected between the internal voltage and a third node;

a sixth resistor connected between the third node and the third voltage; and a third comparator configured to compare a voltage of the third node with a third reference voltage to generate the third enable signal.

7. A method of generating a voltage comprising:

boosting a power voltage to generate first through fourth voltages, wherein the first through fourth voltages are generated by a plurality of boosting units configured to generate at least one corresponding voltage; and controlling a boosting circuit to enable the first through fourth voltages to be generated in sequence by automatically generating a next voltage in the sequence when a current voltage of one of the first through fourth voltages is boosted to a predetermined level, wherein the current voltage and the next voltage are generated by different boosting units of the plurality of boosting units.

8. The method of claim 7, wherein automatically generating a next voltage in the sequence comprises automatically generating a next voltage in the sequence without receiving a voltage generation command from outside or providing a counter.

9. The voltage generator of claim 6, wherein the boosting control circuit is further configured to automatically generate a next voltage in the sequence without receiving a voltage generation command from outside or providing a counter.

* * * * *